United States Patent
Young

[11] Patent Number: 5,480,184
[45] Date of Patent: Jan. 2, 1996

[54] INFLATABLE OCCUPANT RESTRAINT DEVICE

[76] Inventor: William A. Young, 4191 Bigelow Dr., Carson City, Nev. 89701

[21] Appl. No.: 216,565

[22] Filed: Mar. 23, 1994

[51] Int. Cl.⁶ .................................................. B60R 21/16
[52] U.S. Cl. .................... 280/731; 280/729; 280/750; 280/751; 280/728.3
[58] Field of Search ........................ 280/731, 729, 280/728 R, 743 R, 730 R, 750, 751, 753, 728 B

[56] References Cited

U.S. PATENT DOCUMENTS

| | | |
|---|---|---|
| 2,784,006 | 3/1957 | Dye et al. . |
| 2,834,606 | 5/1958 | Bertrand . |
| 2,866,357 | 12/1958 | Houghtaling . |
| 3,189,367 | 6/1965 | Glass . |
| 3,476,402 | 11/1969 | Wilfert . |
| 3,493,244 | 2/1970 | Bozich . |
| 3,552,770 | 1/1971 | Berryman ................... 280/740 |
| 3,600,003 | 8/1971 | Carey . |
| 3,643,971 | 2/1972 | Kushnick . |
| 3,752,501 | 8/1973 | Daniel et al. . |
| 3,799,576 | 3/1974 | Fiala . |
| 3,945,665 | 3/1976 | Tsutsumi et al. . |
| 4,098,525 | 7/1978 | Schwanz et al. . |
| 4,287,621 | 9/1981 | Kertz . |
| 4,449,728 | 5/1984 | Pilatzki . |
| 4,772,045 | 9/1988 | Kawaguchi et al. . |
| 4,785,144 | 11/1988 | Fosnaugh et al. ................ 280/731 |
| 4,852,907 | 8/1989 | Shiraki et al. . |
| 4,915,410 | 4/1990 | Bachelder . |
| 4,944,529 | 7/1990 | Backhaus . |
| 4,968,057 | 11/1990 | Rafferty . |
| 4,989,895 | 2/1991 | Pearson et al. . |
| 5,013,064 | 5/1991 | Miller et al. . |
| 5,114,181 | 5/1992 | Songer . |
| 5,125,682 | 6/1992 | Hensler et al. . |
| 5,174,599 | 12/1992 | Hull et al. . |
| 5,201,543 | 4/1993 | Hull et al. . |

FOREIGN PATENT DOCUMENTS

| | | |
|---|---|---|
| 1954398 | 10/1969 | Germany . |
| 2035742 | 6/1970 | Germany . |
| 2030863 | 12/1971 | Germany ................ 280/743 R |
| 2159449 | 6/1973 | Germany . |
| 6615333 | 5/1967 | Japan ...................... 280/730 R |
| 2242871 | 10/1991 | United Kingdom ............. 280/731 |
| 2263669 | 4/1993 | United Kingdom ........... 280/730 R |

*Primary Examiner*—Eric D. Culbreth
*Attorney, Agent, or Firm*—Shlesinger Arkwright & Garvey

[57] ABSTRACT

An occupant restraining device which includes a dual reusable airbag system with one airbag adjacent to the other. One airbag is inflated prior to installation providing continuous impact protection for the occupant, the other airbag, being generally U-shaped, is inflated upon impact of the vehicle and when inflated provides front and side protection of the occupant.

20 Claims, 4 Drawing Sheets

1

INFLATABLE OCCUPANT RESTRAINT DEVICE

FIELD OF THE INVENTION

The present invention is directed to an inflatable type occupant restraint device and more particularly to a dual airbag system, with one airbag inflated prior to installation and one airbag inflated upon impact.

BACKGROUND OF THE INVENTION

A number of safety devices for use in vehicles to protect vehicle occupants in the event of a collision are known and well documented in prior art. However, it has only been in recent years that airbags have actually been used as a protection device in automobiles.

Airbags must be inflated within a few fractions of a second of the initial impact in order to be effective. However, a disadvantage of the airbag system is that during inflation, the airbag often hits the face of the occupant causing injury.

Another disadvantage is that airbags are usually triggered by a pre-set collision speed and do not protect the occupant from collision at lower speeds of impact which can still cause serious injury and discomfort.

Still further, airbags are not readily reusable and must be replaced by experts in the field of airbags. In addition, typical airbags are generally factory items which are installed at the point of manufacture and are typically not an "add-on" feature.

Also, airbags are generally a shape that when deployed, only protect the front and not the sides of the occupant.

OBJECTS AND SUMMARY OF THE INVENTION

It is therefore an object of the present invention to provide a dual airbag system for vehicle occupant protection at low and high speed collision conditions.

It is another object of the present invention to provide a dual airbag system with one airbag being inflated prior to installation and the other airbag being inflated upon impact.

It is an additional object of the present invention to provide a dual airbag system with reusable airbags.

It is yet another object of the present invention to provide a dual airbag system with at least one airbag being generally U-shaped, so that when inflated, protects both the front and the sides of the occupant.

It is still further another object of the present invention to provide a dual airbag system where at least one airbag is of a non-abrasive material to reduce the possibility of injury on contact with the face of the occupant.

It is still another object of the present invention to provide a dual airbag system in which each airbag can be manually inflated to check for leaks.

It is still another object of the present invention to provide a dual airbag system in combination with a steering assembly.

It is an object of the present invention to provide a housing in the steering assembly to accept known prior art airbag inflator systems which cooperate with the present invention.

It is yet another object of the present invention to provide a dual airbag system which is movable within a steering assembly so as to actuate a horn.

In summary, the present invention provides a safety device for providing vehicle occupant protection from impact comprising a restraining device having reusable first and second inflatable members which are positioned adjacent one another. A valve means is provided to inflate the first inflatable member and to maintain the first inflatable member inflated. Means associated with the second inflatable member permits the second inflatable member to be inflated upon impact.

The present invention also provides a safety device for providing vehicle occupant protection from impact comprising a restraining device having a reusable inflated member and a reusable inflatable member, which are positioned adjacent one another, and means associated with the inflatable member which permits the inflatable member to be inflated upon impact.

In addition, the present invention provides a safety device for providing vehicle occupant protection from impact comprising a generally U-shaped inflatable member, having a means associated with the U-shaped inflatable member which permits the inflation upon impact.

These and other objects of the present invention will become apparent from the following detailed description.

BRIEF DESCRIPTIONS OF THE DRAWINGS

DETAILED DESCRIPTION OF THE INVENTION

Figure 3:
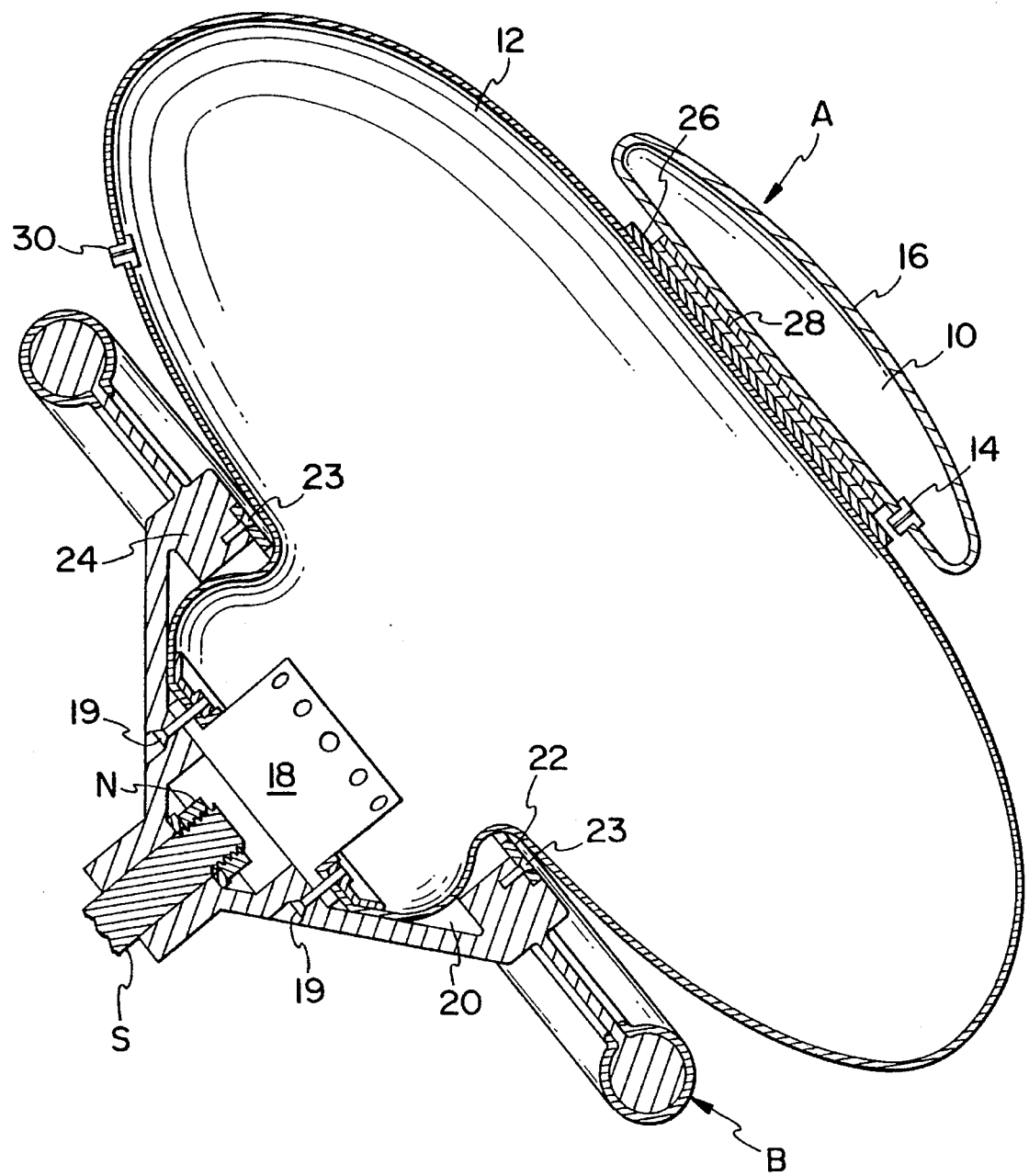
FIG. 3 illustrates the device as shown in FIG. 2 in the deployed position.
Figure 4:
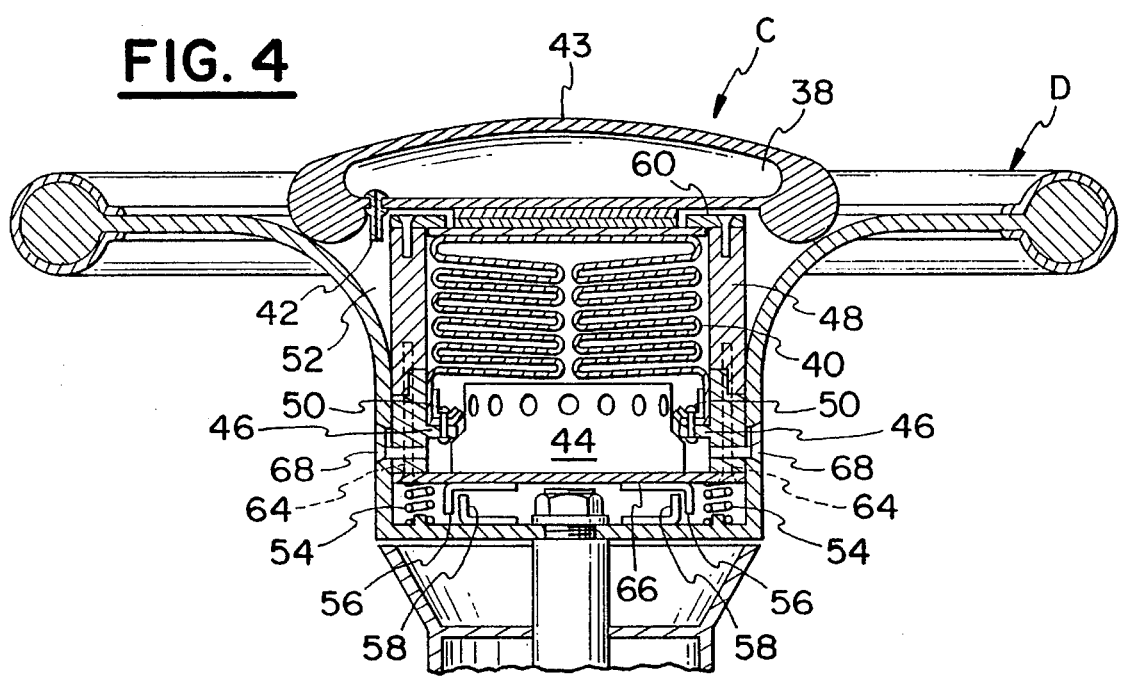
FIG. 4 is a second embodiment of the invention as similarly shown in FIG. 2.
Figure 5:
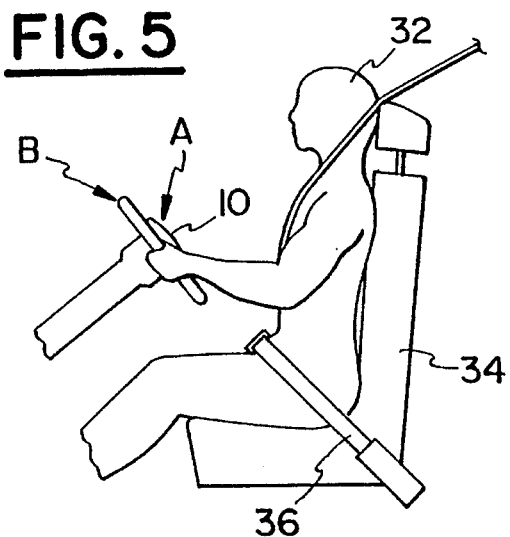
FIG. 5 is a side view of the invention in its stored position.
Figure 6:
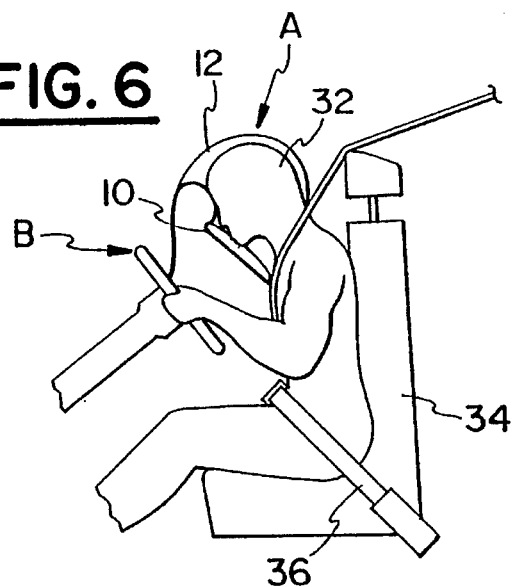
FIG. 6 is a side view of the invention with a portion broken away to show the both airbags inflated about a driver occupant.
Figure 7:
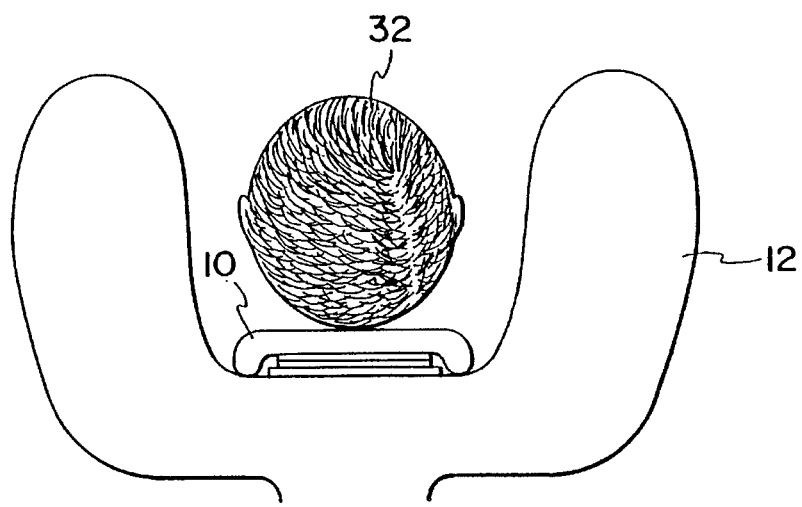
FIG. 7 is top plan view showing both airbags inflated about the head of a driver occupant.

In the accompanying drawings, FIGS. 1–4 disclose the restraining device A incorporated into a steering assembly B, and FIGS. 5–7 disclose the restraining device A as typically incorporated into the driver's side of a vehicle.

Figure 2:
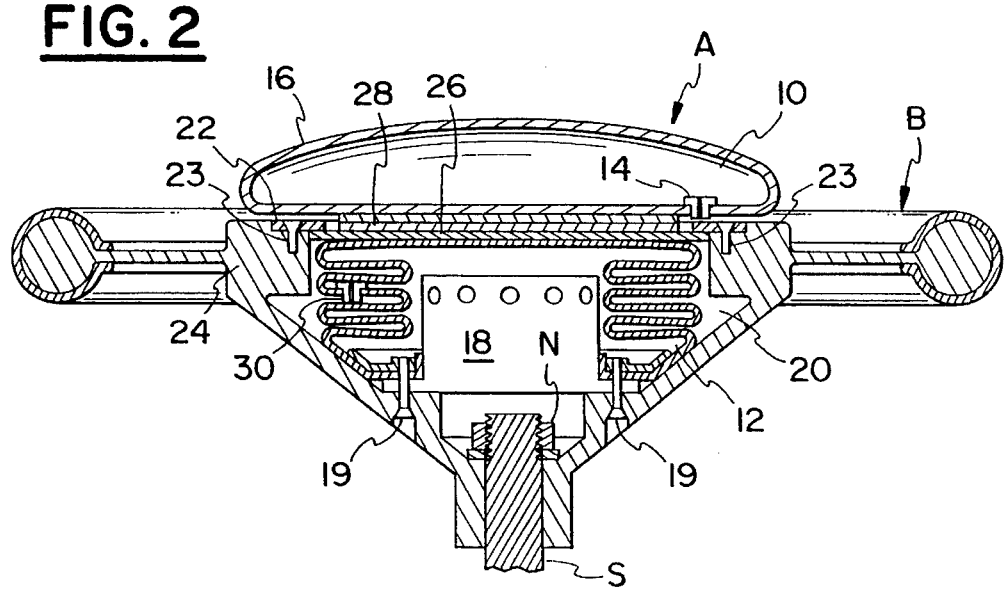
FIG. 2 is a vertical, cross-sectional view taken along line 2—2 of FIG. 1.

As shown in FIG. 2, the restraining device A includes a first inflatable airbag 10 and a second inflatable airbag 12. First airbag 10, which is inflated prior to use, includes a valve 14 which enables first airbag 10 to be inflated and maintained inflated. First airbag 10 is covered with a non-abrasive material 16, such as lamb's wool or felt or the like, to reduce abrasion upon impact.

The steering assembly B is secured onto a steering shaft S by a nut N. Within steering assembly B, a gas generator 18 and second airbag 12 are fixed to the base of cavity 20 in a conventional manner such as by bolts 19. Second airbag 12 is folded to fit within cavity 20 over gas generator 18. Second airbag 12 is inflated upon impact from gas supplied to Second airbag 12 by gas generator 18.

Figure 1:
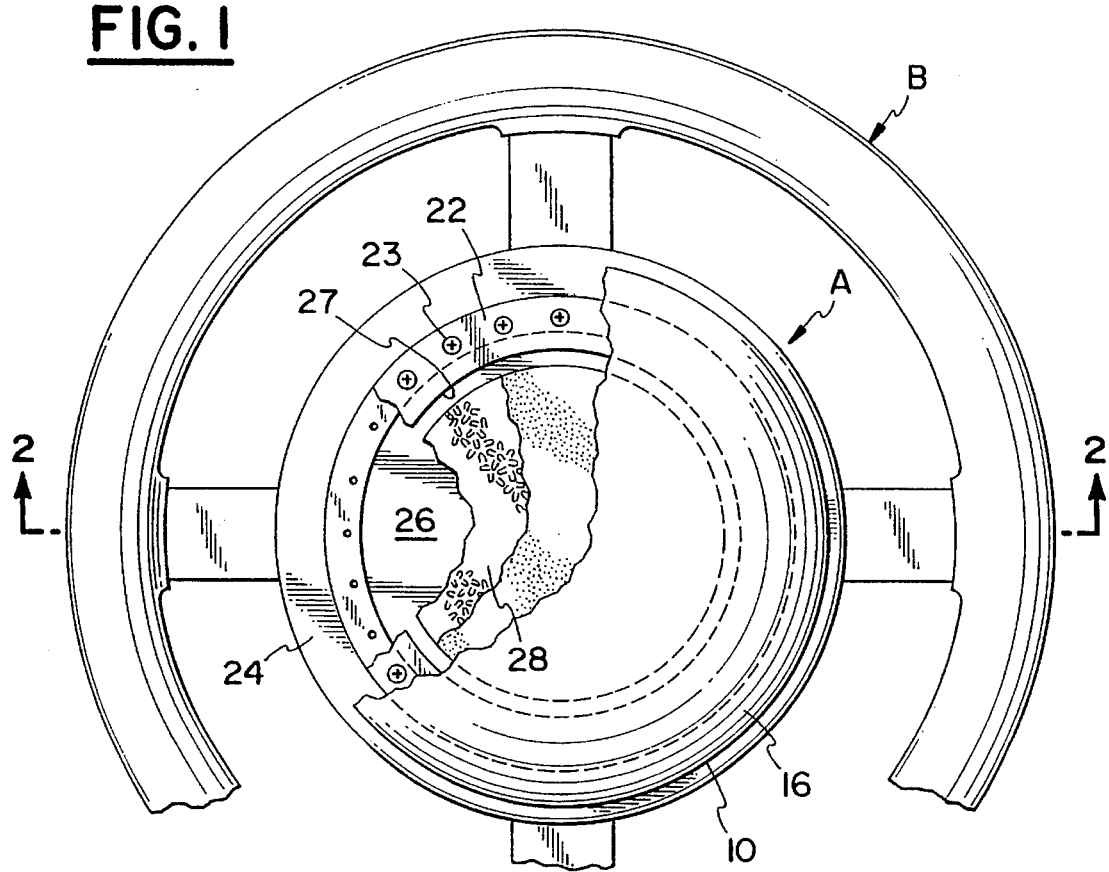
FIG. 1 is a plan view of half of the steering wheel with portions broken away showing the retaining ring and the hook-loop fastener.

As shown in FIGS. 1 and 2, the uninflated second airbag 12 is retained within cavity 20 by a retaining ring 22, which is attached to steering wheel 24 in a conventional manner such as bolts 23, and a flexible membrane 26, which is attached to second airbag 12. Upon impact, when second airbag 12 starts to inflate and after a certain amount of gas has been injected into second airbag 12, flexible membrane 26 is deformed from the pressure of the inflation and escapes out of the retaining ring 22 allowing second airbag 12 to fully inflate, as shown in FIG. 3.

Restraining device A is reusable and can be easily removed from steering assembly B by removing retaining ring 22 and bolts 19. This allows for easy removal and replacement of gas generator 18. Restraining device A can then be reattached to steering assembly B. (Note: this should only be performed by properly trained personnel).

First airbag 10 is removably attached to flexible membrane 26 through the center hole 27 of retaining ring 22 by a hook loop fastener 28 as shown in FIGS. 1 and 2. Hook loop fastener 28 allows first airbag 10 to be readily removed from flexible membrane 26, allowing for easy inflation and maintenance of first airbag 10.

As shown in FIG. 2, second airbag 12 includes a valve 30, which allows second airbag 12 to be inflated and checked for anomalies.

FIG. 5 shows steering assembly B with restraining device A in a first position as it appears for normal driving, with a driver occupant 32 positioned in front of first airbag 10 and strapped to driver seat 34 by a seat belt 36. FIGS. 6 and 7 show steering assembly B with restraining device A in a second position as it would appear just after impact, with a generally U-shaped second airbag 12 substantially inflated and driver 32 hitting restraining device A. The generally U-shaped second airbag 12, when inflated, protects the front and sides of the occupant 32.

The second embodiment of the invention, as shown in FIG. 4, discloses restraining device C, which includes a first airbag 38 and a second airbag 40. First airbag 38, which is inflated prior to use, includes a valve 42 which enables first airbag 38 to be inflated and maintained inflated. First airbag 38 is covered with a non-abrasive material 43, such as lamb's wool or felt or the like, to reduce abrasion upon impact.

Gas generator 44 and second airbag 40 are attached to flanges 46 of the interior of canister 48 in a conventional manner such as by bolts 50. Second airbag 40 is folded to fit within canister 48 over gas generator 44. Second airbag 40 is retained within canister 48 in an identical fashion to the first embodiment as shown in FIGS. 1 and 2 except that retaining ring 60 is attached to canister 48.

Canister 48 is readily removable from within cavity 52 permitting restraining device C to be reusable. Removing bolts 64 from canister 48 permits removal of base plate 66 exposing gas generator 44 allowing for removal and replacement of gas generator 44. Bolts 68 in FIG. 4 permit removal of the canister 48 to permit release of plates 66 upon removal of bolts 64. (Note: this should only be performed by properly trained personnel).

Canister 48 is movably attached within cavity 52 relative to steering assembly D in a conventional manner such as by bolts 68, permitting contacts 56 and 58 to come into contact with each other actuating a horn or the like (not shown). Springs 54 bias canister 48 in a first position where contacts 56 and 58 separated.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A steering wheel safety device for providing occupant protection from impact of a vehicle, comprising:

a) a restraining device including reusable first and second inflatable members;

b) said first inflatable member when inflated having a size positionable entirely within an inside periphery of a wheel handle of a steering wheel assembly and spaced therefrom;

c) said first and second inflatable members each having their central axis coincident with the central axis of the steering wheel assembly;

d) said first inflatable member when inflated having at least portions thereof extending laterally of its central axis beyond the lateral extension of said second inflatable member from its central axis when uninflated;

e) said second inflatable member when inflated extending laterally beyond the lateral extension of said first inflatable member when inflated and extending outside of the periphery of said wheel handle of said steering wheel assembly;

f) valve means for maintaining said first inflatable member inflated when positioned on said steering wheel assembly during normal driving operation thereby functioning as a pre-inflated head impact cushion;

g) means associated with said second inflatable member for permitting said second inflatable member to be inflated upon impact;

h) whereby when said restraining device is positioned in a vehicle, said first inflatable member provides a continuous protective interposition for a vehicle occupant and a damping device for said occupant when said second inflatable member is inflated on impact.

2. A safety device as in claim 1, and wherein:

a) said steering wheel assembly including a central cavity;

b) said steering wheel assembly having a stored position wherein said second inflatable member is disposed within said central cavity when uninflated.

3. A safety device as in claim 2, and further comprising:

a) a retaining ring attached to said steering assembly;

b) a releasable retaining member attached to said second inflatable member; and c) said releasable retaining member positioned between said retaining ring and said second inflatable member to secure said second inflatable member within said central cavity when said restraining device is in said stored position.

4. A safety device as in claim 3, wherein:

a) said first inflatable member is removably attached to said releasable retaining member.

5. A safety device as in claim 4, and further comprising:

a) hook and loop fastener for removably attaching said first inflatable member to said releasable retaining member.

6. A safety device as in claim 1, and further including:

a) housing means removably disposed within said central cavity for retaining said second inflatable member and said means for inflating said second inflatable member.

7. A safety device as in claim 6, wherein:
a) said restraining device is movable relative to said steering assembly for actuating a horn.

8. A safety device as in claim 7, and further comprising:
a) a retaining ring attached to said housing;
b) a releasable retaining member attached to said second inflatable member; and
c) said releasable retaining member positioned between said retaining ring and said second inflatable member to secure said second inflatable member within said housing when said restraining device is in the stored position.

9. A safety device as in claim 8, wherein:
a) said first inflatable member is removably attached to said releasable retaining member.

10. A safety device as in claim 1, and further comprising:
a) means for manually inflating said first inflatable member.

11. A safety device as in claim 1, wherein:
a) said first inflatable member having a non-abrasive external surface.

12. A safety device as in claim 1, wherein:
a) said second inflatable member is generally U-shaped.

13. A steering wheel safety device for providing occupant protection from impact of a vehicle, comprising:
a) a restraining device including reusable first and second inflatable members, said first inflatable member adapted to be releasably secured to said second inflatable member so that when secured, their respective central axes are coaxially aligned;
b) said first and second inflatable members each having their central axis coincident with the central axis of a steering wheel assembly;
c) said first inflatable member when inflated extending laterally of its central axis beyond the lateral extension of said second inflatable member from its central axis when uninflated and positionable entirely within the inside periphery of the wheel handle of the steering wheel assembly and spaced therefrom;
d) said second inflatable member when inflated having at least portions thereof extending laterally beyond the lateral extension of said first inflatable member when inflated and extending outside of the periphery of said wheel handle of said steering wheel assembly;
e) a valve for maintaining said first inflatable member inflated when positioned on said steering wheel assembly during normal driving operation thereby functioning as a pre-inflated head impact cushion;
g) an inflation device associated with said second inflatable member for permitting said second inflatable member to be inflated upon impact;
h) whereby when said restraining device is positioned in a vehicle, said first inflatable member provides a continuous protective interposition for a vehicle occupant and, upon inflation of said second inflatable member, a damping device positively positioned relative to the steering wheel and the vehicle driver occupant.

14. A safety device as in claim 13, and wherein:
a) said steering wheel assembly including a central cavity;
b) said steering wheel assembly having a stored position wherein said second inflatable member is disposed within said central cavity when uninflated.

15. A safety device as in claim 14, and further comprising:
a) a retaining ring attached to said steering assembly;
b) a releasable retaining member attached to said second inflatable member; and
c) said releasable retaining member positioned between said retaining ring and said second inflatable member to secure said second inflatable member within said central cavity when said restraining device is in said stored position.

16. A safety device as in claim 15, wherein:
a) said first and second inflatable members are releasably secured together with a hook and loop fastener device.

17. A safety device as in claim 13, and further including:
a) housing means removably disposed within said central cavity for retaining said second inflatable member and said inflation device.

18. A safety device as in claim 13, and further comprising:
a) means for manually inflating said first inflatable member.

19. A safety device as in claim 13, and wherein:
a) said first inflatable member having a non-abrasive external surface.

20. A safety device as in claim 13, and wherein:
a) said second inflatable member having a generally U-shape when inflated.

\* \* \* \* \*